March 24, 1925.
H. A. PORTER
FLEXIBLE TUBING FASTENER
Filed Nov. 13, 1922
1,530,617
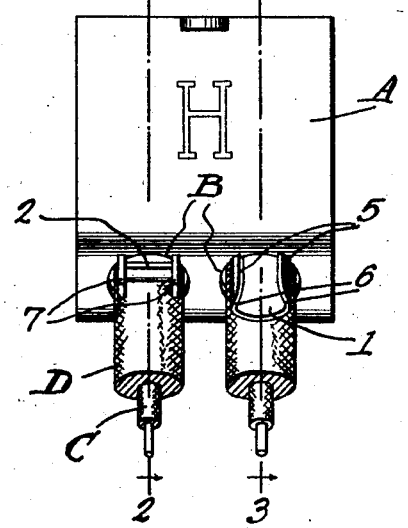
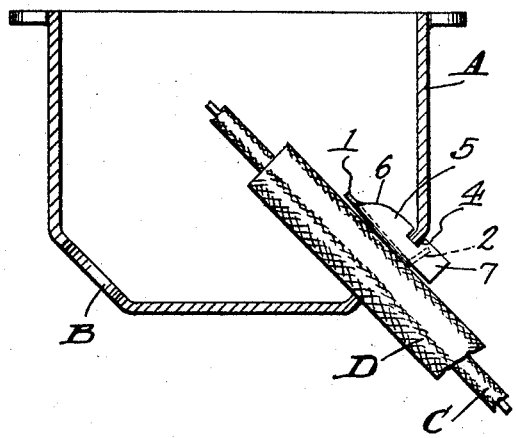
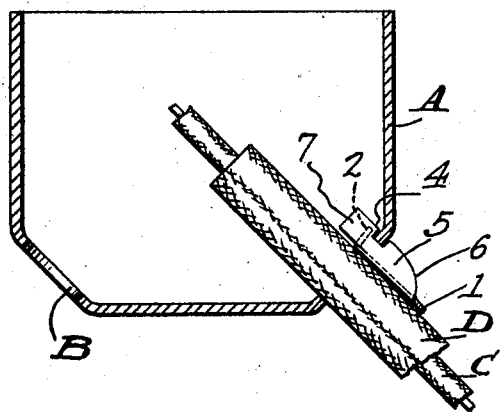
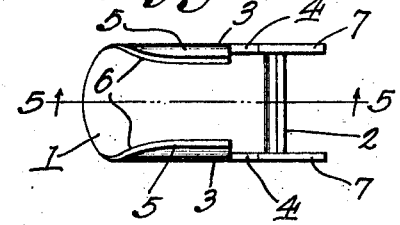
H. A. Porter,
Inventor
By Lester L. Sargent
Attorney Patented Mar. 24, 1925.

1,530,617

UNITED STATES PATENT OFFICE.

HERBERT A. PORTER, OF SAN FRANCISCO, CALIFORNIA.

FLEXIBLE TUBING FASTENER.

Application filed November 13, 1922. Serial No. 600,789.

*To all whom it may concern:*

Be it known that I, HERBERT A. PORTER, a citizen of the United States, residing at San Francisco, in the county of San Francisco and State of California, have invented a new and useful Flexible Tubing Fastener, of which the following is a specification.

The object of my invention is to provide an improved fastener which can be readily inserted in the opening of a switch box or other electrical apparatus to securely fasten the flexible tubing which covers the wiring in place; and to provide a device which can be easily handled by the workman, without danger of injury to his fingers in applying it, and which stays in place regardless of tension exerted on the flexible tubing used in wiring. I attain these and other objects of my invention by the device illustrated in the accompanying drawings, in which—

Figure 1 is a front elevation of a switch box to which two of my fasteners are applied, but in reversed position;

Fig. 2 is a section on line 2—2 of Fig. 1, with the fastener shown in side elevation;

Fig. 3 is a section on line 3—3 of Fig. 1 with the fastener shown in side elevation;

Fig. 4 is an enlarged top plan of the fastener; and

Fig. 5 is a section on line 5—5 of Fig. 4.

Like characters of reference designate like parts in each of the several views.

Referring to the accompanying drawings, there is illustrated a suitable cabinet, outlet box or switch box A having openings B for receiving the wiring C encased by flexible tubing D, which latter member is held firmly in place by the fastener as shown.

The fastener has a base or back 1 with an up-turned end 2 and up-turned sides 3. The up-turned sides 3 have opposite notches or recesses 4 positioned in proximity to the inner side of the up-turned end 2. Portions 7 of the sides project beyond the up-turned end 2 and provide finger holds for grasping the device. The sides 3 have inwardly bent portions 5, the edges of which taper toward the end of the base 1, as shown in Figs. 4 and 5, whereby the device may be readily forced into place.

In assembling and using the fastener it is applied in a manner to wedge the flexible tubing in the opening B of the switch box or cabinet A. It may be inserted from either side of the opening. The recesses or notches 4 in the bent up sides of the fastener engage the edge of the cabinet or switch box and serve to locate the fastener in place so that it will permanently secure the flexible tubing in position in the opening, notwithstanding any twisting, pulling, or bending stresses to which the wiring may be subjected.

From the workman's viewpoint the device is especially advantageous because it is more quickly installed and easier to handle than any other fastener for this purpose, and does not injure the fingers of the workman while putting it in place. It is ordinarily inserted with pliers and may be pushed into place with but little effort. If the workman should forget to install it it can be put in even after the lighting fixture has been connected up.

What I claim is:

1. A sheet metal flexible tubing fastener comprising a base having parallel upturned sides tapering toward one end and said base having a portion bent at an angle thereto and extending between said sides at the opposite end, said sides being provided with aligned notches between the ends of the device at the largest part of the taper.

2. A sheet metal flexible tubing fastener comprising a base having parallel upturned sides tapering toward one end and said base having a portion bent at an angle thereto and extending between said sides at the opposite end, said sides being provided with aligned notches between the ends of the device.

HERBERT A. PORTER.